(12) United States Patent
Takebe et al.

(10) Patent No.: US 8,319,653 B2
(45) Date of Patent: Nov. 27, 2012

(54) METER FOR VEHICLE

(75) Inventors: Minoru Takebe, Niigata (JP); Naoaki Hayakawa, Niigata (JP); Tsuyoshi Kawaguchi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 288 days.

(21) Appl. No.: 12/933,839

(22) PCT Filed: Feb. 20, 2009

(86) PCT No.: PCT/JP2009/052954
§ 371 (c)(1),
(2), (4) Date: Sep. 21, 2010

(87) PCT Pub. No.: WO2009/116350
PCT Pub. Date: Sep. 24, 2009

(65) Prior Publication Data
US 2011/0018702 A1    Jan. 27, 2011

(30) Foreign Application Priority Data

Mar. 21, 2008  (JP) ................................. 2008-072779
Dec. 24, 2008  (JP) ................................. 2008-327440

(51) Int. Cl.
*G08B 3/00*   (2006.01)
*G08B 5/00*   (2006.01)
*G08B 7/00*   (2006.01)

(52) U.S. Cl. ................ 340/691.6; 340/693.5; 340/691.1

(58) Field of Classification Search ................ 340/691.6, 340/691.1, 693.5

See application file for complete search history.

(56) References Cited

U.S. PATENT DOCUMENTS

| 6,294,990 B1 * | 9/2001 | Knoll et al. ................... 340/461 |
| 6,461,006 B1 | 10/2002 | Matumoto |
| 7,321,294 B2 * | 1/2008 | Mizumaki ..................... 340/438 |

FOREIGN PATENT DOCUMENTS

| JP | 6-038593 | 2/1994 |
| JP | 7-248385 | 9/1995 |
| JP | 2000-161996 | 6/2000 |
| JP | 2000-193498 | 7/2000 |

(Continued)

*Primary Examiner* — Travis Hunnings
(74) *Attorney, Agent, or Firm* — McDermott Will & Emery LLP

(57) ABSTRACT

A meter for vehicle capable of improving design and visibility in an after-meter of single face type is provided. The meter for vehicle includes a transmitting ring-shaped member 4 placed to surround an analog display portion 1 between a case body 2 and a cover member 3, a first light source 5 emitting first illumination light L1, and a second light source 6 emitting second illumination light L2. The meter for vehicle also includes a light-guide member 7 placed between the display plate 12 and the first light source 5 and having an entrance portion 72 into which the first illumination light L1 enters, a first exit portion 73 from which the first illumination light L1 exits toward the pointer 11, a first reflecting portion 74 which reflects the first illumination light L1 in a direction in parallel with the display plate 12, a second reflecting portion 75 which reflects the first illumination light L1, reflected by the first reflecting portion 74, in a direction perpendicular to the display plate 12, and a second exit portion 76 from which the first illumination light L1 reflected by the second reflecting portion 75 exits toward the ring-shaped member 4.

7 Claims, 2 Drawing Sheets

FOREIGN PATENT DOCUMENTS

| | | |
|---|---|---|
| JP | 2001-074511 | 3/2001 |
| JP | 2001-264126 | 9/2001 |
| JP | 2001-304922 | 10/2001 |
| JP | 2002-071392 | 3/2002 |
| JP | 2003-139582 | 5/2003 |
| JP | 2004-093311 | 3/2004 |
| JP | 2004-226363 | 8/2004 |
| JP | 2006-194636 | 7/2006 |
| JP | 2006-226729 | 8/2006 |
| JP | 2007-093366 | 4/2007 |

* cited by examiner

A-A

METER FOR VEHICLE

RELATED APPLICATIONS

This application is the U.S. National Phase under 35 U.S.C. §371 of International Application No. PCT/JP2009/052954, filed on Feb. 20, 2009, which in turn claims the benefit of Japanese Application Nos. 2008-072779, filed on Mar. 21, 2008 and 2008-327440, filed on Dec. 24, 2008, the disclosures of which Applications are incorporated by reference herein.

TECHNICAL FIELD

The present invention relates to a meter for vehicle which displays vehicle information, and more particularly, to an additional meter of single face type in which a single analog display portion is housed in a case body.

BACKGROUND ART

Meters for vehicle for displaying various running states of vehicles (hereinafter referred to as vehicle informations) such as vehicle speed, engine RPM, water temperature, and oil pressure include, for example, an additional meter of single face type wherein a pointer is mounted on a drive body, and a single analog display portion for displaying a measurement amount indicating the vehicle information by rotating the pointer on a display plate is housed in a case body, thereby monitoring the vehicle information in more detail independently of a combination meter typically mounted on a vehicle (for example, see Patent Document 1).

Patent Document 1: JP-A-6-38593
Patent Document 2: JP-A-2001-304922

DISCLOSURE OF THE INVENTION

Problems that the Invention is to Solve

In such an additional meter of single face type, improvements in design and visibility have been needed in recent years. A known method as means for enhancing the visibility and design in the meter for vehicle is to provide a light-transmitting ring-shaped member around a display plate to transmit light through the ring-shaped member for illumination as disclosed in Patent Document 2.

The method to provide the ring-shaped light-transmitting member as described above, however, relates to a combination meter which has a plurality of analog display portions and digital display portions. If such a structure is applied to the additional meter of single face type without any change, the additional meter of single face type has small space around a display plate and a user cannot visually recognize the light through the ring-shaped member sufficiently when the ring-shaped member is provided on the display plate.

The present invention has been made by focusing attention on the abovementioned problem, and it is an object of the present invention to provide a meter for vehicle capable of improving visibility and design in an additional meter of single face type in which a single analog display portion is housed in a case body.

Means for Solving the Problems

To solve the abovementioned problem, the present invention is characterized by a meter for vehicle in which a case body containing a single analog display portion which is consisted of a display plate having an indicating portion and a pointer which rotates on the display plate to point at the indicating portion, the meter for vehicle including a transmitting or semi-transmitting cover member covering the analog display portion exposed from the case body, a transmitting ring-shaped member placed to surround the analog display portion between the case body and the cover member, a first light source placed on a back-face side of the display plate and emitting first illumination light which illuminates the pointer, a second light source placed on the back-face side of the display plate and emitting second illumination light which illuminates the display plate, and a light-guide member placed between the display plate and the first light source and having an entrance portion into which the first illumination light enters, a first exit portion from which the first illumination light exits toward the pointer, a first reflecting portion which reflects the first illumination light in a direction in parallel with the display plate, a second reflecting portion which reflects the first illumination light, reflected by the first reflecting portion, in a direction perpendicular to the display plate, and a second exit portion from which the first illumination light reflected by the second reflecting portion exits toward the ring-shaped member.

The present invention is also characterized in that the ring-shaped member includes a light-shield layer formed on a side-face portion.

The present invention is also characterized in that the ring-shaped member is colored in the same color as light emitted by the first light source.

The present invention is also characterized in that the ring-shaped member is colored in a different color from a color of light emitted by the first light source.

The present invention is also characterized in that the second illumination light transmits through the light-guide member to illuminate the display plate.

The present invention is also characterized in that the cover member includes a stepped portion on an outer periphery side and the ring-shaped member is placed at a position opposite to the stepped portion.

The present invention is also characterized in that the case body has a cylindrical shape.

Advantage of the Invention

The present invention relates to a meter for vehicle which displays vehicle information, and enables improved visibility and design in an additional meter of single face type in which a single analog display portion is housed in a case body.

Figure 1:
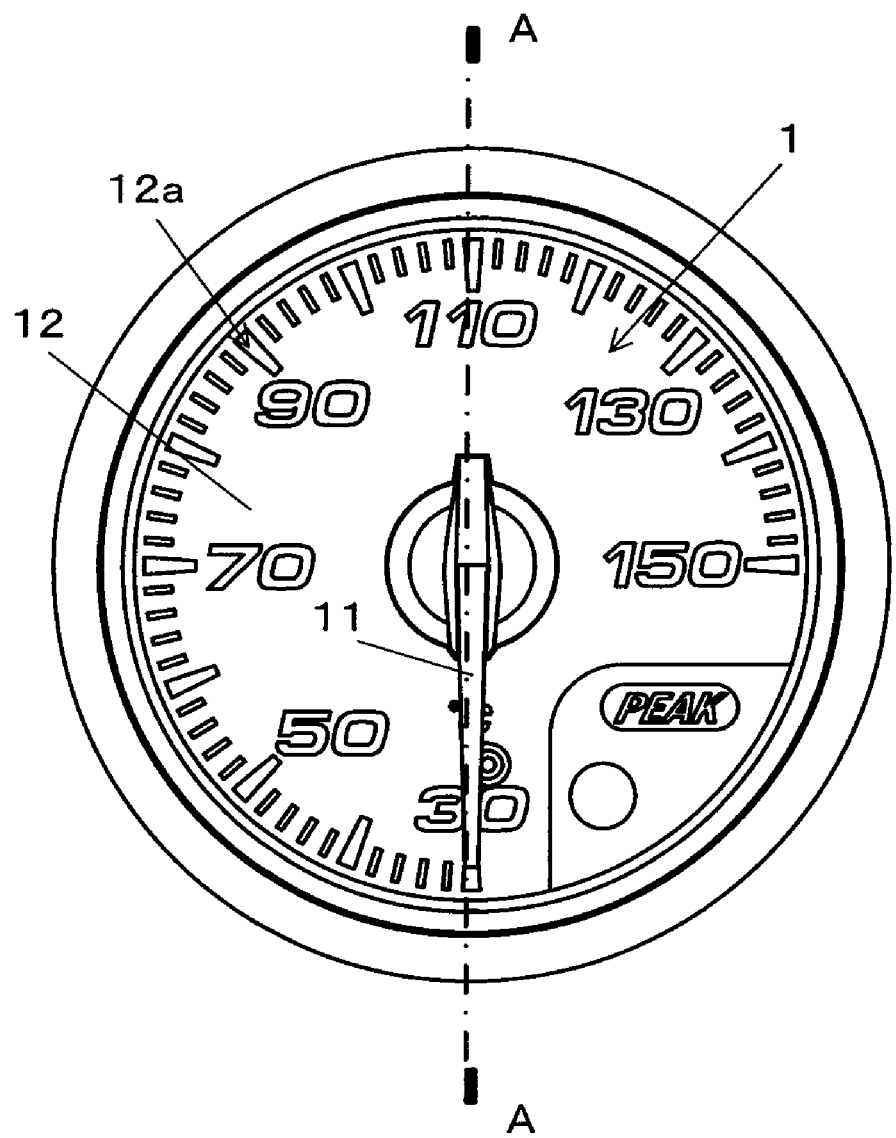
[FIG. 1] An outside drawing showing a meter for vehicle which is an embodiment of the present invention.

FIG [2] A section view showing the meter for vehicle.

DESCRIPTION OF REFERENCE NUMERALS AND SIGNS 1 display portion
11 pointer
12 display plate
2 meter case (case body)
3 front-face cover (cover member)
4 facing member (ring-shaped member)
5 first light source
6 second light source
7 light-guide member 71 through-hole
72 entrance portion
73 first exit portion
74 first reflecting portion
75 second reflecting portion
76 second exit portion
L1 first illumination light
L2 second illumination light

BEST MODE FOR CARRYING OUT THE INVENTION

Figure 2:
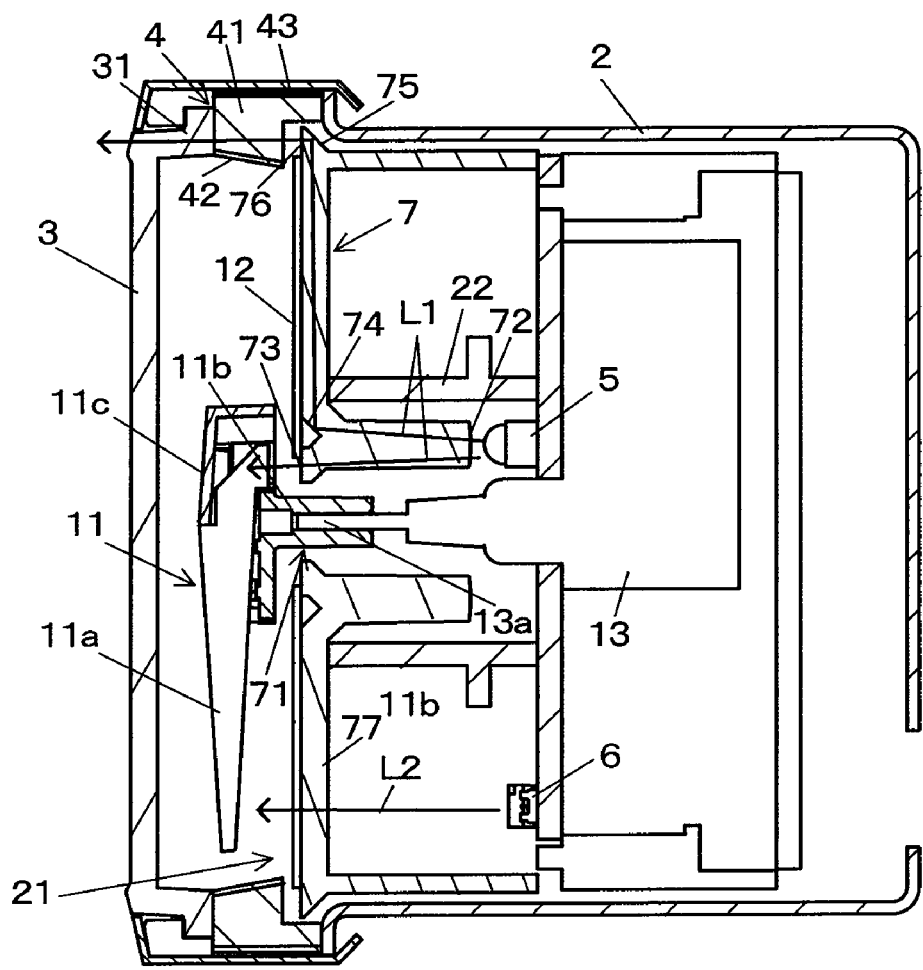

In the following, an embodiment in which the present invention is applied will be described with reference to the accompanying drawings. FIG. 1 shows the outer appearance of a meter for vehicle, and FIG. 2 is a section view of the meter for vehicle. The meter for vehicle is mainly formed of a display portion 1, a meter case (case body) 2, a front-face cover (cover member) 3, a facing member (ring-shaped member) 4, a first light source 5, a second light source 6, and a light-guide member 7.

The display portion 1 is an analog display portion having a pointer 11 and a display plate 12, and is housed in the meter case 2 such that the pointer 11 and the display plate 12 are exposed from an opening portion 21. A user can read vehicle information by comparing the pointer 11 and an analog indicating portion 12a formed through printing on the display plate 12. In the present embodiment, the display portion 1 displays the temperature of engine oil (oil temperature) as the vehicle information and can display the oil temperature in a range from 30° C. to 150° C.

The pointer 11 has a pointing portion 11a made of transmitting resin material, a pointer base portion 11b fixed to a rotation shaft 13a provided for a stepping motor 13 serving as a rotation drive member, and a pointer cap 11c serving as a light-shield member for covering the front face of the pointer base portion 11b and made of black-color synthetic resin material. Red-color foil is hot-stamped to the back-face side of the pointing portion 11a. The pointer 11 rotates on the display plate 12 in association with rotation of the stepping motor 13 to cause the pointing portion 11a to point at the analog indicating portion 12a on the display plate 12. The pointer 11 is illuminated in a predetermined color by transmission of first illumination light L1 from the first light source 5 placed in the meter case 2.

The display plate 12 is provided by forming a light-shield layer through printing with a light-shield ink except for the area serving as the analog indicating portion 12a on the front-face side of a transmitting substrate and forming a reflecting layer through printing with application of a white-color ink onto the back-face side except for the area opposite to the analog indicating portion 12a. The analog indicating portion 12a has a plurality of indications formed of scales or numbers and provided in a substantially ark shape. The analog indicating portion 12a is formed such that the minimum scale position corresponds to the angle of six o'clock and the maximum scale position corresponds to the angle of 3 o'clock. The display plate 12 is illuminated in a predetermined display color by transmission of second illumination light L2 through the analog indicating portion 12a from the second light source 6 placed in the meter case 2.

The meter case 2 is a case body of substantially cylindrical shape made of metal material, for example aluminum, and accommodates various members constituting the meter for vehicle. The meter case 2 has the opening portion 21 on the front-face side for exposing the display portion 1. A partitioning wall 22 is provided in the meter case 2 for partitioning of illuminating regions of the first and second light sources 5 and 6.

The front-face cover 3 is made of transmitting synthetic resin material or semi-transmitting synthetic resin material of dark color such as black, for example, and covers the opening portion 21 of the meter case 2. The front-face cover 3 has a stepped portion 31 on the outer periphery side and has a shape in which the central portion protrudes forward as compared with the outer periphery side.

The facing member 4 is a ring-shaped member placed to surround the display portion 1 between the meter case 2 and the front-face cover 3. The facing member 4 is formed integrally of a non-transmitting resin material and a transmitting resin material and is formed such that a transmitting layer 41 made of the transmitting synthetic resin material is sandwiched on both side faces between light-shied layers 42 and 43 made of the non-transmitting resin material. The facing member 4 is placed at the position opposite to the stepped portion 31 of the front-face cover 3. The transmitting layer 41 is illuminated by transmission of the first illumination light L1 from the first light source 5. The light-shield layer 42 formed on the inner side face of the facing member 4 prevents the first illumination light L1 passing through the transmitting layer 41 from being applied toward the center of the display portion 1 and causes that light L1 to travel in the front-face side direction. The light-shield layer 43 formed on the outer side face of the facing member 4 prevents the first illumination light L1 passing through the transmitting layer 41 from being leaked from the side to the outside and causes that light L1 to travel in the front-face side direction.

The first light source 5 is formed, for example, of a light-emitting diode (LED), is placed on the back-face side of the display plate 12, and emits the first illumination light L1 which illuminates the pointer 11. In the present embodiment, the first illumination light L1 shows a red color as the emission color.

The second light source 6 is formed, for example, of an LED, is placed on the back-face side of the display plate 12, and emits the second illumination light L2 which illuminates the display plate 12. In the present embodiment, the second illumination light L2 has a different emission color from that of the first illumination light L1, and shows a white color as the emission color.

The light-guide member 7 is a transmitting member made of a transmitting synthetic resin material such as polycarbonate and acrylic and is provided to be located between the display plate 12 and the first and second light sources 5 and 6 in the meter case 2. The light-guide member 7 has a through-hole 71 at the central portion through which the rotation shaft 13a of the stepping motor 13 passes. The light-guide member 7 guides the first illumination light L1 from the first light source 5 to the pointer 11 and the facing member 4, and has an entrance portion 72 into which the first illumination light L1 enters, a first exit portion 73 from which the first illumination light L1 exits toward the pointer 11, a first reflecting portion 74 which reflects the first illumination light L1 in a direction in parallel with the display plate 12, a second reflecting portion 75 which reflects the first illumination light L1, reflected by the first reflecting portion 74, in a direction perpendicular to the display plate 12, and a second exit portion 76 from which the first illumination light L1 reflected by the second reflecting portion 75 exits toward the facing member 4. Thus, after the first illumination light L1 enters into the entrance portion 72, part of the light L1 enters into the pointer 11 via the first exit portion 73 and transmits through the pointing portion 11a and illuminates it. Another part of the first illumination light L1 enters the transmitting layer 41 which is the central portion of the facing member 4 via the first reflecting portion 74, the second reflecting portion 75, and the second exit portion 76, and transmits through the facing portion 4 and illuminates it. At this point, since the first illumination light L1 exits outside from the facing member 4 opposite to the stepped portion 31 of the front-side cover 3, the user has the impression that the outer periphery of the front-face cover 3 emits light in a ring shape. The entrance portion 72 has a convex shape with a curved surface so that the first illumination light L1 from the first light source efficiently enters. The second illumination light L2 transmits through a flat plate portion 77 between the first reflecting portion 73 and the second reflecting portion 74 of the light-guide member 7 to transmit through the analog indicating portion 12a of the display portion 12 and illuminate it. Since the flat plate portion 77 is formed to be parallel with the display plate 12, the second illumination light L2 can transmit through the flat plate portion 77 and illuminate the analog indicating portion 12a.

The portions described above constitute the meter for vehicle.

In such a meter for vehicle, since the light-guide member 7 is provided for guiding the first illumination light L1 from the first light source 5 to the pointer 11 and the facing member 4, the user can visually recognize the light in the ring shape sufficiently even in the additional meter of single face type having small space around the display plate 12. In addition, it is possible to employ the design in which the outer periphery of the front-face cover 3 emits light in the ring shape, not simply around the display plate 12, so that the visibility and design can be improved.

Since the light-shield layers 42 and 43 are formed on the side-face portion of the facing member 4, the first illumination light L1 for illuminating the facing member 4 is not applied into the display portion 1 or leaked from the side to the outside, which can maintain the display quality of the display portion 1.

In addition, the flat plate portion 77 in parallel with the display plate 12 is provided at the position opposite to the second illumination light L2 in the light-guide member 7, so that the second illumination light L2 can transmit through the light-guide member 7 and illuminate the display plate 12. This allows favorable illumination of the display plate 12 even in the structure for illuminating the facing member 4.

Since the stepped portion 31 is formed on the outer periphery side of the front-face cover 3 and the facing member 4 is placed at the position opposite to the stepped portion 31, the stepped portion 31 can emphasize the light from the facing member 4 to improve the design and visibility.

In the present embodiment, the transmitting layer 41 of the facing member 4 may be colored in the same color as the color of the light emitted by the first light source 5. The transmitting layer 41 is formed in a red color in the present embodiment. Thus, in the transmission of the first illumination light L1 from the first light source 5 for illumination, the facing member 4 can be illuminated without being affected by the second illumination light L2 from the second light source with the different emission color. As a result, the illumination color can be uniformed in the pointer 11 and the facing member 4 illuminated by the first light source 5 to enhance the appearance and improve the marketability.

In the present embodiment, the transmitting layer 41 of the facing member 4 may be colored in a different color from the color of the light emitted by the first light source 5. In the present embodiment, the first light source 5 emits light of a color such as a white color having wavelengths in the visible light range and the transmitting layer 41 is formed in a red color, for example. Thus, in the transmission of the first illumination light L1 from the first light source 5 for illumination, the illumination color of the facing member 4 can be changed into a different color (red color) from the color of the light emitted by the first light source 5. As a result, the appearance can be enhanced and the marketability can be improved.

Industrial Applicability

The present invention relates to a meter for vehicle which displays vehicle information, and is preferable for use in an additional meter of single face type in which a single analog display portion is housed in a case body.

The invention claimed is:

1. A meter for vehicle in which a case body containing a single analog display portion which is consisted of a display plate having an indicating portion and a pointer which rotates on the display plate to point at the indicating portion, the meter for vehicle comprising:
    a transmitting or semi-transmitting cover member covering the analog display portion exposed from the case body;
    a transmitting ring-shaped member placed to surround the analog display portion between the case body and the cover member;
    a first light source placed on a back-face side of the display plate and emitting first illumination light which illuminates the pointer;
    a second light source placed on the back-face side of the display plate and emitting second illumination light which illuminates the display plate; and
    a light-guide member placed between the display plate and the first light source and having an entrance portion into which the first illumination light enters, a first exit portion from which the first illumination light exits toward the pointer, a first reflecting portion which reflects the first illumination light in a direction in parallel with the display plate, a second reflecting portion which reflects the first illumination light, reflected by the first reflecting portion, in a direction perpendicular to the display plate, and a second exit portion from which the first illumination light reflected by the second reflecting portion exits toward the ring-shaped member.

2. The meter for vehicle according to claim 1, wherein the ring-shaped member includes a light-shield layer formed on a side-face portion.

3. The meter for vehicle according to claim 1, wherein the ring-shaped member is colored in the same color as a color of light emitted by the first light source.

4. The meter for vehicle according to claim 1, wherein the ring-shaped member is colored in a different color from a color of light emitted by the first light source.

5. The meter for vehicle according to claim 1, wherein the second illumination light transmits through the light-guide member to illuminate the display plate.

6. The meter for vehicle according to claim 1, wherein the cover member includes a stepped portion on an outer periphery side and the ring-shaped member is placed at a position opposite to the stepped portion.

7. The meter for vehicle according to claim 1, wherein the case body has a cylindrical shape.

* * * * *